United States Patent Office 3,444,490
Patented May 13, 1969

3,444,490
ELECTROMAGNETIC STRUCTURES FOR
ELECTRICAL CONTROL DEVICES
Donald E. Krummel and David L. Bowles, Lima, Ohio,
assignors to Westinghouse Electric Corporation, Pittsburgh, Pa., a corporation of Pennsylvania
Filed Sept. 30, 1966, Ser. No. 583,362
Int. Cl. H01h 67/02, 9/20
U.S. Cl. 335—126                                    8 Claims This invention relates to electrical control devices, such as circuit interrupters or circuit breakers, relays and contactors, and more particularly to electromagnetic structures which form part of such devices.

In the construction of certain types of electrical control devices, an electromagnetic structure is provided which includes a movable armature or plunger that is actuated between different operating positions with respect to an associated stationary magnetic structure by the energization of one or more operating coils or windings which form part of the electromagnetic structure. In order to bias the movable armature of such a structure toward one of its operating positions, a suitable biasing means such as a compression spring may be provided as part of the electromagnetic structure. The movable armature of such a structure may be actuated against the force of the associated biasing means from the operating position to which it is normally biased by energizing the associated operating coil to a second operating position with respect to the associated stationary magnetic structure. In certain applications, it has been found desirable to provide some means for latching the movable armature in the second operating position just described after the armature has been actuated to the second operating position in order to permit the deenergization of the associated operating coil. Mechanical types of latches which have been employed in the past for this purpose have the disadvantage that they require a number of moving parts. If a magnetic type of latching structure is employed which is separate from the associated electromagnetic structure of the type described, the size and weight of such a magnetic latching structure are objectionable in certain applications, such as aircraft applications. It is therefore desirable to provide an improved electromagnetic structure of the type described including means for magnetically latching the armature in at least one operating position which is more compact in size and in which the weight of the magnetic parts is kept to a minimum.

It is an object of this invention to provide a new and improved electromagnetic structure for electrical control devices.

Another object of this invention is to provide an improved electromagnetic structure for electrical control devices including means for magnetically latching the movable armature of such a structure in at least one operating position of the electromagnetic structure.

A more specific object of this invention is to provide an improved electromagnetic structure including a movable armature with means for magnetically latching the armature in at least one operating position which is more compact and lower in weight than known magnetic latching means.

Still a further object of this invention is to provide an improved electromagnetic structure including means for magnetically latching the movable armature of the structure in at least one operating position in which the different portions of the electromagnetic structure are used to carry flux produced by the coil or windings and are also employed to carry the magnetic flux which is provided by the magnetic latching means.

Other objects of the invention will, in part, be obvious and will, in part, appear hereinafter.

For a fuller understanding of the nature and objects of the invention, reference should be had to the following detailed description taken in conjunction with the accompanying drawings in which.

Figure 7:
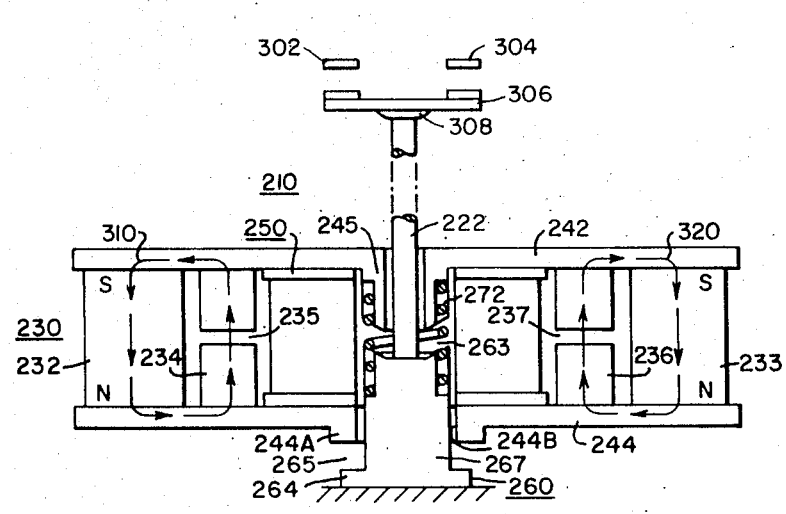
FIG. 7 is a diagrammatic view of an electromagnetic structure illustrating a second embodiment of the invention with the associated contact means of the electromagnetic structure being shown in the open circuit condition.
Figure 8:
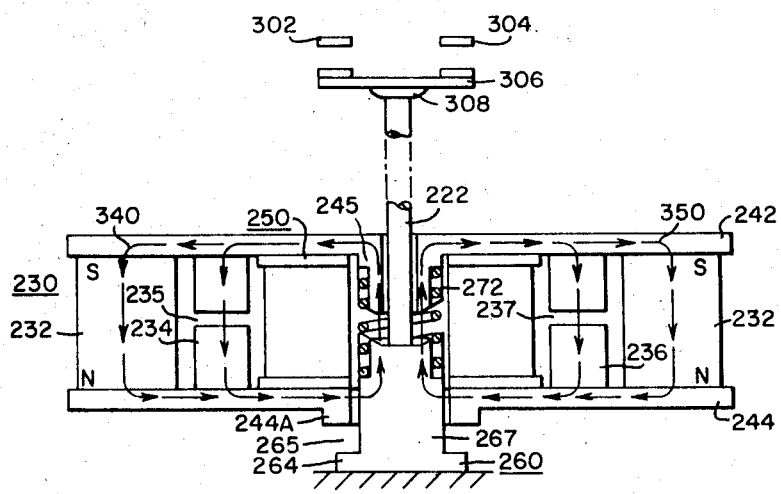
Figure 9:
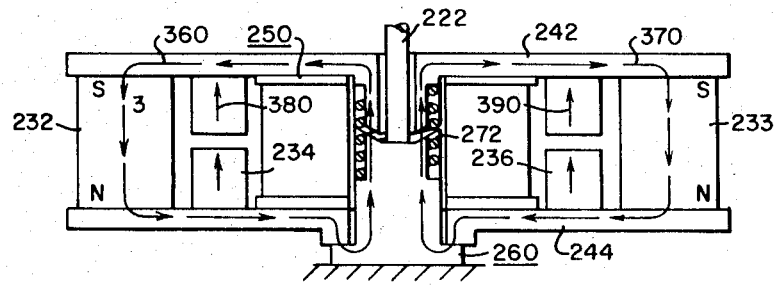
Figure 10:
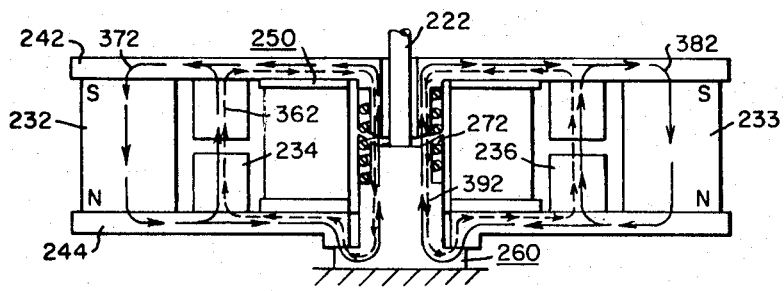
Figure 11:
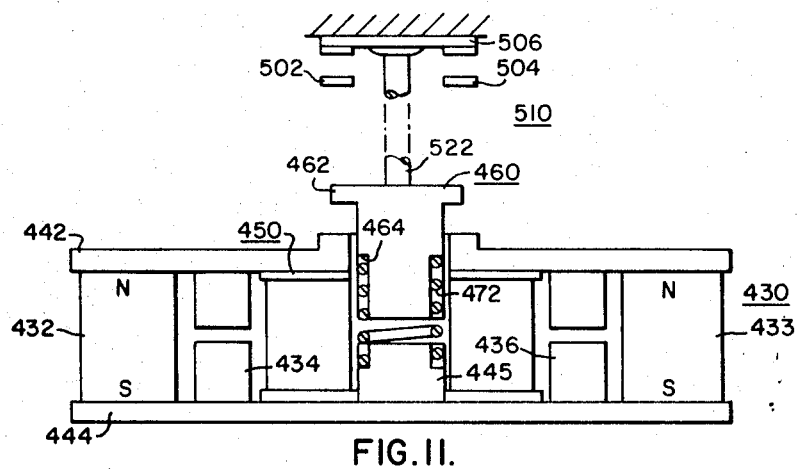

FIGS. 8 through 10 are diagrammatic views of the electromagnetic structure shown in FIG. 7 illustrating different operating conditions of the electromagnetic structure shown in FIG. 7; and FIG. 11 is a diagrammatic view of an electromagentic structure illustrating a third embodiment of the invention with the associated contact means of the electromagnetic structure being shown in the open circuit condition.

Figure 1:
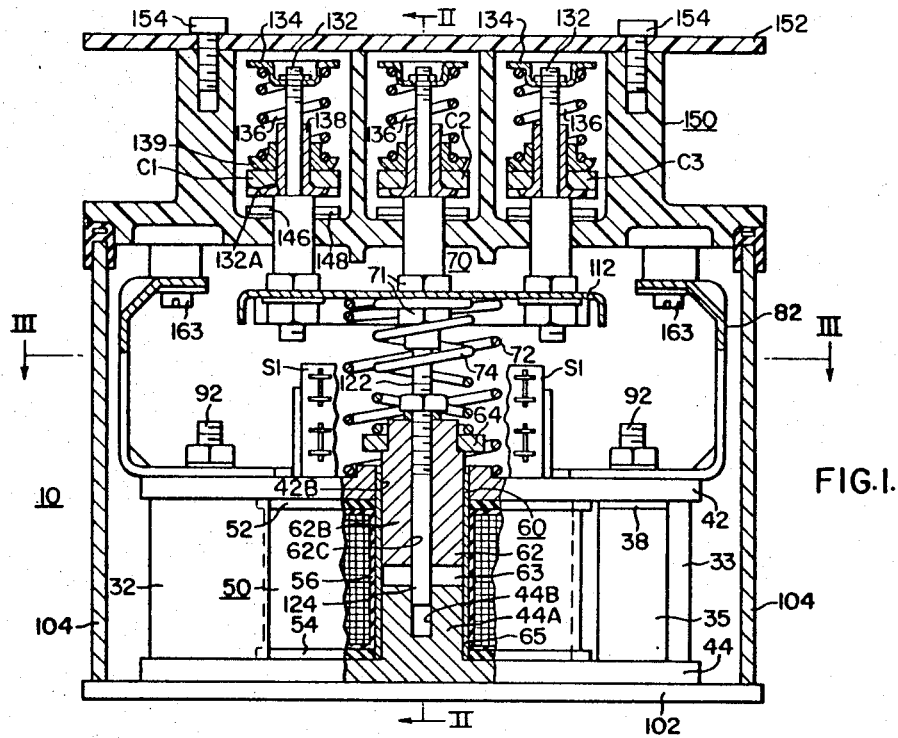
FIGURE 1 is a front elevational view, partially in section and partly cut away, of a contactor illustrating a first embodiment of the invention with the contact means of the contactor being shown in the open circuit position.
Figure 2:
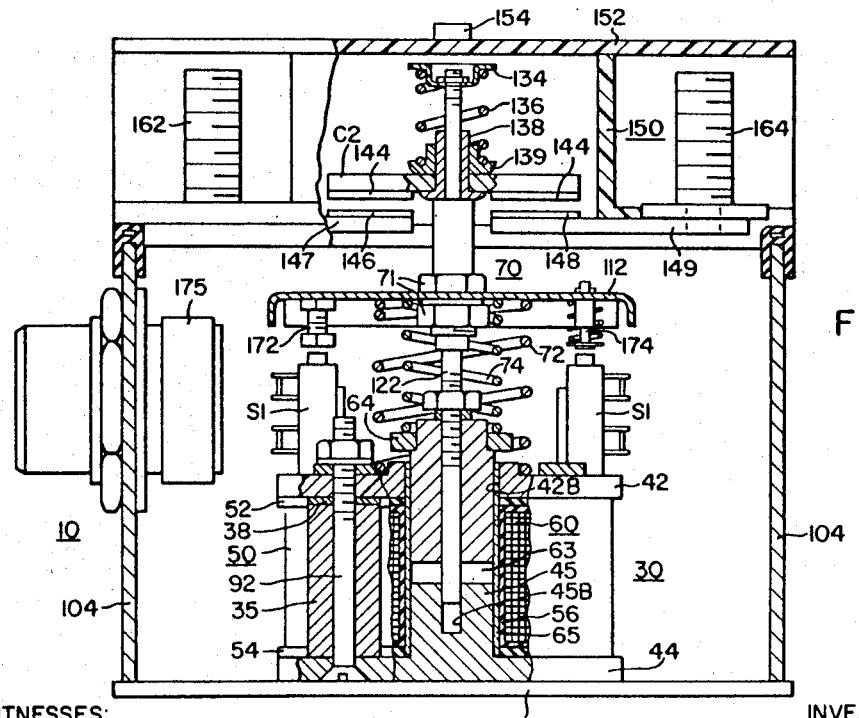
FIG. 2 is a side elevational view, in section, of the contactor shown in FIG. 1, taken along the line II—II of FIG. 1.

Referring now to the drawings and FIGS. 1 and 2 in particular, there is illustrated an electrical control device, more specifically a contactor 10 embodying the principal features of the invention and illustrating a first embodiment of the invention. In general the contactor 10 comprises a stationary magnetic structure 30 on which an energizing or operating coil or winding means 50 is inductively disposed to control the actuation of a movable armature or plunger 60 which is operatively connected or coupled to a contact carrier assembly 70 to, in turn, control the opening and closing of the separable contacts of the contactor 10.

Figure 3:
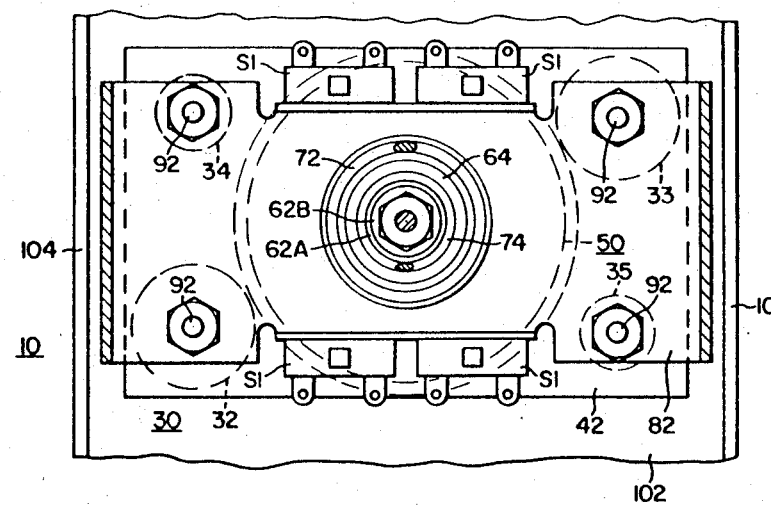
FIG. 3 is a partial plan view, in section, of the contactor shown in FIG. 1, taken along the line III—III of FIG. 1.

More specifically, the stationary magnetic structure 30, as best shown in FIGS. 1 and 3, comprises a pair of spaced upper and lower plates 42 and 44, respectively, which are formed from a suitable soft magnetic material, such as iron. As illustrated in FIG. 3, each of the plates 42 and 44 is generally rectangular in configuration with the plates 42 and 44 being disposed in substantially parallel relationship. The stationary magnetic structure 30 also includes a central leg member or portion 45 which is also formed from a suitable soft magnetic material, such as iron, and which projects upwardly from the lower plate 44 for only a portion of the distance between the plates 42 and 44, as shown in FIG. 1. The central leg member 45 may be formed integrally with the lower plate 44 or may be provided as a separate member which is secured to the lower plate 44 by suitable means, such as a bolt. It is to be noted that in one operating position of the movable armature 60, as shown diagrammatically in FIG. 5, the lower end of the armature 60 seats against or engages the top or upper surface of the central leg member 45. In the other operating position of the armature 60, the lower end of the armature 60 as shown in FIGS. 1 and 2 is spaced away from the top or upper surface of the central leg member 45 by a predetermined distance or gap, as indicated at 63 in FIGS 1 and 2.

In order to permit the armature 60 to pass through the upper plate 42 of the stationary magnetic structure 30 and to permit the coupling of the armature 60 to the contact carrier assembly 70, the upper plate 42 includes a central opening 42B through which the armature 60 passes. In order to guide the reciprocating or rectilinear movement of the armature 60 between a first operating position which is shown in FIGS. 1 and 2 and a second operating position which is shown diagrammatically in FIG. 5, a tubular member or sleeve 65 may be provided as shown in FIGS. 1 and 2 which extends from the central opening 42B in the upper plate 42 downwardly to the lower magnetic plate 44 to enclose the central leg member 45. The sleeve 65 is formed from a suitable non-magnetic material, such as brass and forms a non-magnetic gap between the armature 60 and the upper plate 42 around the opening 42B. The magnetic plate 42 also includes a raised or shoulder portion 42A which projects upwardly from the plane of the main portion of the plate 42 around the opening 42B and functions as a seat which is engaged by the ring-shaped member 64 of the plunger 60 in the operating position of the plunger 60 shown diagrammatically in FIG. 5 to thereby bridge the non-magnetic gap formed by the sleeve 65. It is to be noted that the shoulder portion 42A also acts as a retainer for the spring 72, whose purpose will be explained hereinafter.

In order to provide a magnetic path having a relatively low reluctance between the magnetic plates 42 and 44 outside the operating coil means 50 which also functions as a shunt path for the flux from the permanent magnet members 32 and 33 in certain operating conditions of the contactor 10, the stationary magnetic structure 30 includes a pair of outer magnetic leg members 34 and 35 which are disposed between the plates 42 and 44 at a diagonally opposite corners of the plates 42 and 44, as shown in FIG. 3, and which are formed from a suitable soft magnetic material, such as iron. In order to provide a predetermined non-magnetic gap in each of the magnetic paths are provided by the outer leg members 34 and 35, a non-magnetic washer or spacer member 38 formed of a suitable material, such as brass, is disposed, as illustrated, between the upper end of each of the outer leg members 34 and 35 and the upper magnetic plate 42, as best shown in FIGS. 1 and 2, for a purpose which will be explained hereinafter. It is to be noted that each of the outer leg members 34 and 35 is generally hollow cylindrical in configuration, as illustrated, and that the outer leg members 34 and 35 may be maintained in assembled relationship with the associated plates 42 and 44 by suitable means, such as the non-magnetic bolts 92, which pass through aligned openings in the associated plates and leg members.

Figure 4:
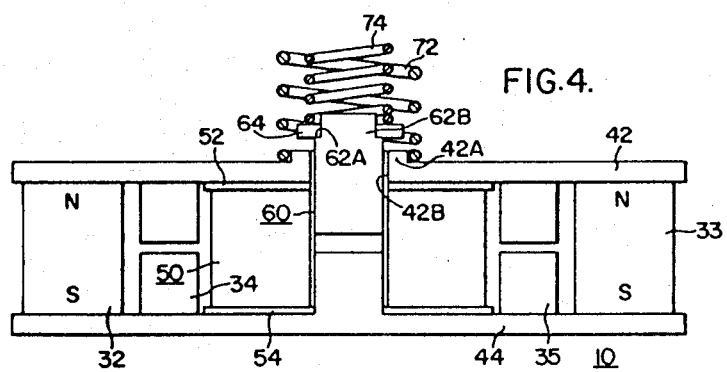
FIG. 4 is a diagrammatic view illustrating the operation of the electromagnetic structure which forms part of the contactor shown in FIG. 1 with the electromagnetic structure being shown in the operating position which corresponds to the open circuit condition of the contactor.
Figure 5:
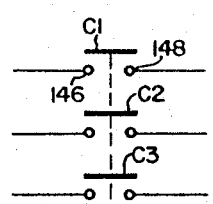
FIG. 5 is a diagrammatic view, similar to FIG. 4, illustrating the operating condition of the electromagnetic structure which forms part of the contactor shown in FIG. 1 which corresponds to the closed circuit condition of the contactor.
Figure 5:
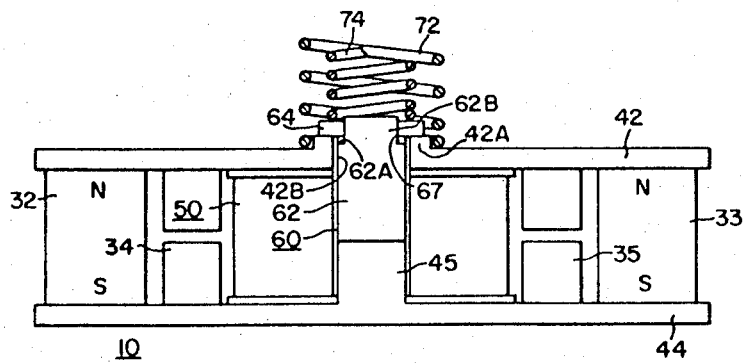

In order to magnetically latch the plunger 60 in the operating position shown in FIG. 5 which, in this case, corresponds to the closed position of the separable contacts in the contactor 10, the stationary magnetic structure 30 also includes a pair of permanent magnet members 32 and 33 which are disposed between the magnetic plates 42 and 44 at the other diagonally opposite corners of said plates, as shown in FIG. 3, and which are generally hollow cylindrical in configuration to permit assembly with the associated plates 42 and 44 by suitable means, such as the non-magnetic bolts 92. It is to be noted that the permanent magnet members 32 and 33 are disposed wtih like magnetic poles adjacent to the respective magnetic plates 42 and 44, as best shown in FIG. 4 and 5.

As best shown in FIGS. 1 and 2, the armature or plunger 60 is generally T-shaped in cross-section and comprises a first generally cylindrical member 62 and a second generally annular or ring-shaped member 64 which are both formed from a suitable soft magnetic material, such as iron as disclosed and claimed in copending application Ser. No. 571,583, filed Aug. 10, 1966, now Patent No. 3,371,297 by James L. Ridings and assigned to the same assignee as the present application. The major portion of the cylindrical member 62 is disposed in concentric relation with the sleeve or guide member 65 for reciprocating movement within the sleeve member 65 between the position shown in FIGS. 1 and 2 and the postiion shown in FIG. 5. The upper end of the cylindrical member 62 includes a portion of reduced cross-section, as indicated at 62B, around which the ring-shaped member 64 is concentrically disposed and along which the ring-shaped member 64 is axially movable during a portion of the travel of the plunger or armature 60, as will be explained hereinafter. The upper end of the cylindrical member 62 also includes a shoulder portion, as indicated at 62A, against which the ring-shaped member 64 is biased or held by the compression spring 74 which is disposed between the ring-shaped member 64 and a common movable contact support 112 which forms part of the contact carrier assembly 70 in one operating position of the armature 60 as will be described hereinafter. It is important to note that the ring-shaped member 64 of the armature 60 is disposed to move axially and seat against a first portion of the stationary magnetic structure 30 which is the shoulder portion 42A of the upper plate 42 prior to and independently of the lower end of the cylindrical member 62 of the armature 60 which subsequently seats against the upper surface of the central leg portion 45 when the armature 60 is actuated from the position shown in FIGS. 1 and 2 to the operating position shown in FIG. 5. Since the non-magnetic gap formed by the upper end of the sleeve 65 is first magnetically shunted or bridged by the ring-shaped member 64, substantially all of the magnetic forces acting on the armature 60 are effective to close the air gap 63 between the lower end of the armature 60 and the central leg portion 45.

In order to provide a predetermined radial gap or spacing between the ring-shaped member 64 and the upper portion 62B of the cylindrical member 62, the cross-sectional area or diameter of the upper portion 62B is slightly smaller than the cross-sectional area or diameter of the central opening in the ring-shaped member 64 with the radial gap between the ring-shaped member and the cylindrical member 62 being preferably of a relatively small size on the order of 0.001 inch. A predetermined radial gap is also provided between the outer periphery of the cylindrical member 62 and the portion of the upper plate 42 around the opening 42B by the thickness of the sleeve member 65 which is disposed concentrically between the upper plate 42 and the cylindrical member 62.

In order to operatively couple or connect the armature 60 to the contact carrier assembly 70, a non-magnetic connecting shaft 122 may be provided which includes a threaded portion that projects into and engages an internally threaded central opening 62C in the cylindrical member 62 of the armature 60, as shown in FIGS. 1 and 2. The common movable contact support 112 may be secured to the connecting shaft 122 by suitable means such as the lock nuts 71, shown in FIGS. 1 and 2. In order to assist in guiding the reciprocating movement of the plunger or armature 60 within the sleeve member 65, the connecting shaft 122 may be extended or a separate guide pin 124 may be provided in the central opening 62C of the cylindrical member 62 which projects downwardly into an aligned central opening 45B in the central leg member 45 of the stationary magnetic structure 30 with the guide pin 124 being formed from a suitable non-magnetic material, such as brass or non-magnetic stainless steel. The armature or plunger 60 is biased generally upwardly away from the central leg member 45 of the stationary magnetic structure 30 by a suitable means, such as the compression spring 72, which is disposed between the upper magnetic plate 42 and the contact support 112 of the contact carrier assembly 70 with the biasing force from the spring 72 being transmitted through the contact support 112 and the connecting shaft 122 to the armature 60. The shoulder portion 42A of the upper magnetic plate 42 functions as a retainer for the spring 72, as previously mentioned, with the spring 72 being disposed in substantially concentric relationship with the compression spring 74.

In order to actuate the armature plunger 60 between the different operating positions previously described, the energizing or operating coil or winding means 50 is disposed between the plates 42 and 44 around the central leg portion 45 of the stationary magnetic structure 30 and around the lower portion of the cylindrical member 62 of the armature 60 with the pair of outer leg members 34 and 35 being disposed outside the operating coil means 50 at a first pair of diagonally opposite corners of the stationary magnetic structure 30 as shown in FIG. 3 and with the pair of permanent magnet members 32 and 33 being disposed outside the operating coil means 50 at the other pair of diagonally opposite corners of the stationary magnetic structure 30, as shown in FIG. 3. The conductor turns of the operating coil means 50 may be wound on an insulating spool or bobbin which, in turn, is supported on the sleeve member 65 which may be conveniently employed as a coil form. The additional electrically insulating washers 52 and 54 may be disposed between the opposite ends of the insulating spool 56 and the adjacent upper and lower magnetic plates 42 and 44, respectively, as best shown in FIGS. 1 and 2. As shown diagrammatically in FIG. 6, the operating coil or winding means 50 may include a first winding portion 50A and a second winding portion 50B which may be separately energized from a source of unidirectional voltage, as indicated at the terminals T1, T2 and T3, to either actuate the plunger in one direction to close the contacts of the contactor 10 or in the opposite direction to open the contacts of the contactor 10. More specifically, when a voltage is applied to the first winding portion 50A and current flows in the conductor turns of the first winding portion 50A, the magnetic flux which is produced may be in the same direction as the flux which is supplied to the armature 60 and the central leg portion 45 from the permanent magnet members 32 and 33. On the other hand, when the voltage is applied to the second winding portion 50B and the current flows therein, the magnetic flux which is produced thereby may be opposing in direction with respect to the magnetic flux supplied from the permanent magnet members 32 and 33 to the armature 60 and the central leg portion 45 of the stationary magnetic structure 30, as will be explained in greater detail hereinafter.

Referring again to FIGS. 1 and 2, the contact carrier assembly 70 includes a common contact support 112 which is secured to the connecting shaft 122 and is operatively coupled to the armature 60 for reciprocating movement therewith by the shaft 122. As illustrated, the contact carrier assembly 70 includes a plurality of laterally spaced movable contact bridging members C1, C2 and C3 which are resiliently supported on a plurality of associated laterally spaced shafts or posts 132 which are secured to and project upwardly from the common contact support 112, as shown in FIGS. 1 and 2. Each of the contact bridging members C1 through C3 is slidably supported on the upper end of one of the shafts 132 between a pair of concentric electrical insulating members 138 and 139, as best shown in FIG. 1. Each of the electrical insulating members 138 includes a flange portion at the lower end which is disposed between one of the contact bridging members C1 through C3 and a shoulder portion 132A which is provided on each of the shafts 132 to limit the downward movement of the associated contact bridging member on the shaft 132. A pair of contact members 144 are mounted on and disposed at the opposite ends of each of the contact bridging members C1 through C3, as best shown in FIG. 2. In order to provide contact pressure between the contact bridging members C1 through C3 and the associated stationary contacts as will be described hereinafter, a compression spring 136 is disposed between each of the contact bridging members C1 through C3 and a cup-shaped washer 134 which is secured to each of the shafts 132 adjacent to the upper end thereof to function as a spring seat for the upper end of each of the compression springs 136. Each of the insulating members 139 includes a flange portion which acts as a spring seat for the lower end of one of the associated compression springs 136.

In order to support a plurality of stationary contact members in the line of travel of the contact bridging members just described, the insulating terminal board 150 is provided and includes a plurality of spaced compartments. The insulating terminal board 150 is supported on a generally U-shaped bracket member 82 with the terminal board 150 being secured by suitable means to the bracket means 82, such as the bolts 163 shown in FIG. 1. The bracket member 82 in turn is mounted on and supported by the stationary magnetic structure 30 and is secured to the stationary magnetic structure by suitable means, such as the bolts 92. More specifically, the contactor 10 includes a plurality of pairs of spaced contacts 146 and 148 which are disposed adjacent to and in the line of travel of the associated contact bridging members C1 through C3. The stationary contacts 146 and 148 are electrically connected to the associated terminal posts 162 and 164 respectively by the electrically conducting members 147 and 149, respectively.

In order to totally enclose the operating parts of the contactor 10, a housing structure may be provided which includes the base member 102 which may be secured to the stationary magnetic structure 30 by suitable means, such as bolts (not shown), and a plurality of side wall members 104 which extend between the base member 102 and the lower portion of the insulating terminal board 150 which forms part of the overall housing structure. A cover member may be secured to the top of the insulating terminal board 115 by suitable means, such as the bolts or screws 154. Where desired, the leads or wires from the operating coil or any wiring provided may pass through one of the side walls 104 through a suitable connector means, as indicated at 175.

In order to prevent the simultaneous energization of the first and second winding portions 50A and 50B, respectively, of the operating coil or winding means 50 previously described, one or more auxiliary switches S1 through S4 may be mounted on top of the stationary magnetic structure 30 in the line of travel of the common contact support 112, as best shown in FIG. 2. A plurality of actuating members 172 and 174 may be mounted on the common contact support 112 to project downwardly from the common contact support to engage corresponding plunger members provided on top of the respective auxiliary switches S1 through S4 to thereby prevent the simultaneous energization of the first and second winding portions 50A and 50B respectively of the operating coil or winding means as indicated diagrammatically in FIG. 6.

Considering the overall operation of the contactor 10, it will be assumed initially that the separable contacts of the contactor 10 are in the open circuit position as shown in FIGS. 1 and 2 and that the movable armature 60 is in a corresponding position as shown diagrammatically in FIG. 4 with the lower end of the armature 60 being spaced from the central leg portion 45 of the stationary magnetic structure by a predetermined spacing or nonmagnetic gap, as indicated at 63. It will also be assumed initially that neither of the winding portions 50A and 50B is initially energized and that substantially all of the magnetic flux from the permanent magnet members 32 and 33 is concentrated in the magnetic paths which include the outer leg members 34 and 35 with very little magnetic flux from the permanent magnet members 32 and 33 flowing through the magnetic path which includes the armature 60 and the central leg portion 45. It is to be noted at this time that the armature 60 is held in the position shown in FIG. 4 by the biasing force applied to the plunger 60 by the compression spring 72 which tends to actuate the plunger 60 in an upward direction, as viewed in FIG. 4. It is also to be noted that in the initial operating position of the plunger 60, the relative reluctance of the magnetic path which includes the plunger or armature 60 and the central leg portion 45 is greater than that of the magnetic paths which include the outer leg members 34 and 35 to the greater magnetic gap present between the armature 60 and the central leg portion 45 of the stationary magnetic structure 30.

Figure 6:
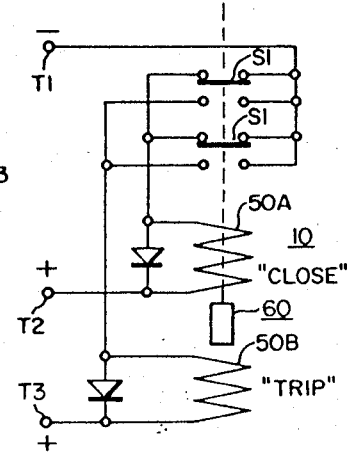
FIG. 6 is a diagrammatic view illustrating the electrical connections of the contactor shown in FIG. 1 in a typical application.

In order to close the separable contacts of the contactor 10, the first winding portion or closing coil 50A, as shown in FIG. 6, is energized from the input terminals T1 and T2 through the normally closed contacts of the auxiliary switches S1, as illustrated. Prior to the energization of the first winding portion or closing coil 50A, it is to be noted that the magnetic flux supplied by the permanent magnet members 32 and 33 travels through three parallel closed loops which extends from the upper end of each of the permanent magnet members 32 and 33 through the upper magnetic plate 42, and then downwardly through the three separate magnetic paths which include the outer leg members 34 and 35, the armature 60 and the central leg member 45 to the lower magnetic plate 44 and then back to the lower end of the respective permanent magnet members 32 and 33. In the assumed operating condition prior to the energization of the first winding portion 50A, most of the magnetic flux supplied from the permanent magnet members 32 and 33 will flow through the magnetic paths which include the outer leg members 34 and 35, as previously mentioned. When the first winding portion or closing coil 50A is energized, the magnetic flux produced by the current flow through the first winding portion 50A will be in the same direction through the armature 60 and the central leg member 45 as the flux supplied from the permanent magnet members 32 and 33 with the magnetic flux produced by current flow in the first winding portion 50A being opposing or in an opposite direction with respect to the magnetic flux supplied from the permanent magnet members 32 and 33 to the outer leg members 34 and 35. The magnetic flux supplied from the permanent magnet members 32 and 33 will therefore be effectively shifted or transferred from the outer leg members 34 and 35 to the magnetic path which includes the armature 60 in the central leg portion 45 of the stationary magnetic structure 30. The armature 60 will then be actuated or attracted downwardly by the magnetic flux from the permanent magnet members 32 and 33 and by the magnetic flux produced by current flow in the first winding portion 50A until the lower end of the armature 60 seats against the top of the central leg portion 45 and the ring-shaped magnetic member 64 of the plunger or armature 60 seats against the shoulder portion 42A of the upper magnetic plate 42, as best shown diagrammatically in FIG. 5. Since the ring-shaped member 64 is resiliently mounted on the cylindrical member 62 of the armature 60, the ring-shaped member 64 will seat on the shoulder portion 42A of the upper magnetic plate 42 prior to and independently of the cylindrical member 62 of the armature 60, as shown in FIG. 5, since the cylindrical member 62 is free to move downwardly to seat against the top of the central leg portion 45 of the stationary magnet structure after the ring-shaped member 64 comes to rest against the shoulder portion 42A of the upper magnetic plate 42 which acts as a stop for the downward travel of the ring-shaped member 64.

It is to be noted that in the operating position of the armature 60 shown in FIG. 5, the ring-shaped member 64 is actually spaced away from the shoulder portion 62A on the armature 60 and that a predetermined radial gap previously described will be present between the ring-shaped member 64 and the cylindrical member 62. It is important that the radial gap or spacing which exists between the ring-shaped member 64 and the cylindrical member 62 will remain substantially constant despite the wear of the parts that will result from the seating of the ring-shaped member 64 on the shoulder portion 42A of the upper magnetic plate 42 and from the seating of the lower end of the cylindrical member 62 of the armature 60 on top of the central leg member 45 of the stationary magnetic structure 30.

While the armature 60 is actuated downwardly to the operating position shown in FIG. 5, the contact bridging members C1 through C3 previously described will also be actuated in a downward direction to engage the associated pairs of stationary contacts 146 and 148 of the contactor 10. When the plunger 60 is actuated from the position shown in FIG. 4 to the operating position shown in FIG. 5 to thereby close the separable contacts of the contactor 10, the magnetic flux supplied from the permanent magnet members 32 and 33, which was previously concentrated in the magnetic paths which include the outer leg members 34 and 35, will be transferred to the magnetic path which includes the armature 60 and the central leg member 45 of the stationary magnetic structure 30 and will remain concentrated in the magnetic path which includes the armature 60 and the central leg portion 45 since the reluctance of the magnetic path which includes the armature 60 will be relatively less than the reluctance of the magnetic paths which include the outer leg members 34 and 35 since the lower end of the armature 60 is now seated against the top of the central leg portion 45 to thereby substantially eliminate the gap 63 which previously existed between the armature 60 and the central leg portion 45 as shown in FIG. 4. When the armature 60 reaches the operating position shown in FIG. 5, the auxiliary switches S1 mounted on top of the stationary magnetic structure 30 will be actuated to the opposite operating positions to thereby deenergize the first winding portion or closing coil 50A since the contacts of the auxiliary switches S1 shown in FIG. 6 will be actuated to the open positions during the closing of the main separable contacts of the contactor 10. The magnetic flux supplied from the permanent magnet members 32 and 33 will remain in the magnetic path which includes the armature 60 shown in FIG. 5 even though the first winding portion is deenergized by the associated auxiliary switches at the end of the travel of the armature 60 because of the relatively lower reluctance which results in the magnetic path which includes the armature 60 as just described. In summary, the magnetic flux supplied from the permanent magnet members 32 and 33 will magnetically latch the contactor 10 in the closed circuit condition shown in FIG. 5 since the magnetic flux from the permanent magnet members 32 and 33 will be substantially concentrated in the magnetic path which includes the armature 60 to thereby retain the armature 60 in the operating position shown in FIG. 5 against the force exerted on the armature 60 by the biasing spring 72.

In order to open the closed separable contacts of the contactor 10 and to actuate the armature 60 from the position shown in FIG. 5 back to the original operating position shown in FIG. 4, the second winding portion 50B shown in FIG. 6 may now be energized through the contacts of the auxiliary switches S1, which will now permit energization of the second winding portion or tripping coil 50B from the terminals T1 and T3. When the second winding portion or tripping coil 50B is energized, the magnetic flux produced by the second winding portion or tripping coil 50B will be in a direction opposite to that of the magnetic flux produced in the armature 60 from the permanent magnet members 32 and 33 to thereby transfer or shift most of the magnetic flux from the permanent magnet members 32 and 33 from the magnetic path which includes the armature 60 and the central leg portion 45 back to the outer leg members 34 and 35. When the magnetic flux is shifted from the path which includes the armature 60 and the central leg portion 45, the forces exerted on the armature 60 by the biasing spring 72 is sufficient to actuate the armature 60 upwardly from the operating position shown in FIG. 5 back to the operating position shown in FIG. 4 with the previously closed separable contacts of the contactor 10 being opened by the upward movement of the contact bridging members C1 through C3 back to the positions shown in FIGS. 1 and 2.

Referring now to FIGS. 7 through 10, there is shown an electrical control device, more specifically a contactor 210 illustrating a second embodiment of the invention. In general, the contactor 210 is similar to the contactor 10 previously described except that the movable contact means 306 of the contactor 210 is pushed into engagement with the associated stationary contact means 302, 304 rather than being pulled into engagement by the associated armature as in the contactor 10. Similarly to the contact 10, the contactor 210 comprises a stationary magnetic structure 230 on which an energizing or operating coil or winding means 250 is inductively disposed to control the actuation of a movable armature or plunger 260 which is operatively connected or coupled to the movable contact means 306 to, in turn, control the opening and closing of the separable contacts of the contactor 210.

Mre specifically, the stationary magnetic structure 230 comprises a pair of spaced upper and lower plates 242 and 244, respectively, which are formed from a suitable soft magnetic material, such as iron. Similarly to the plates 42 and 44 of the contactor 10, the plates 242 and 244 may be generally rectangular in configuration with the plates 242 and 244 being disposed in substantially parallel relationship. The stationary magnetic structure 230 also includes a central leg member or portion 245 which is also formed from a suitable soft magnetic material, such as iron, and which projects downwardly from the upper plate 242 for only a portion of the distance between the plates 242 and 244, as shown in FIG. 7. The central leg member 245 may be formed integrally with the upper plate 242 or may be provided as a separate member which is secured to the upper plate 242 by suitable means, such as bolts. It is to be noted that in one operating position of the armature 260, as shown in FIG. 9, the upper end of the armature 260 is disposed adjacent to or seats against the lower surface of the central leg member 245. In the other operating position in the armature 260, the upper end of the armature 260, as shown in FIG. 7, is spaced away from the lower surface of the central leg member 245 by a predetermined distance or nonmagnetic gap, as indicated at 263 in FIG. 7.

In order to permit the armature 260 to pass through the lower plate 244 of the stationary magnetic structure 230, the lower plate 244 includes a central opening 244B through which the armature 260 passes. In order to guide the reciprocating or rectilinear movement of the armature 260 between the different operating positions, a tubular member or sleeve (not shown) may be provided similarly to that provided in the contactor 10 which would extend from the central opening 244B in the lower plate 244 upwardly to the upper magnetic plate 242 to enclose the central leg member 245 and which would be formed from a suitable non-magnetic material. The lower magnetic plate 244 may also include a raised or shoulder portion 244A which projects downwardly from the plane of the main portion of the plate 244 around the opening 244B and functions as a seat which is engaged by the flanged portion 264 of the armature 260 in the operating position of the armature 260 shown diagrammatically in FIG. 9.

In order to provide a magnetic path having a relatively low reluctance between the magnetic plates 242 and 244 outside the operating coil means 250, the stationary magnetic structure 230 includes a pair of outer magnetic leg members 234 and 236 which are disposed between the plates 244 and 242 and which may be disposed at the diagonally opposite corners of the plates 242 and 244 similarly to the corresponding parts of the contactor 10 previously described. The outer leg members 234 and 236 are formed from a suitable soft magnetic material, such as iron. In order to provide a predetermined nonmagnetic gap in each of the magnetic paths which are provided by the outer leg members 234 and 236, as indicated at 235 and 237, respectively, a suitable non-magnetic washer or spacer member (not shown) may be disposed between each of the outer leg members 234 and 236 and the associated plates 242 and 244 similarly to the corresponding parts of the contactor 10 previously described.

In order to magnetically latch the armature 260 in the operating position shown in FIG. 9 which in this case corresponds to the closed position of the separable contacts of the contactor 210, the stationary magnetic structure 230 also includes a pair of permanent magnet members 232 and 233 which are disposed between the magnetic plates 242 and 244 and which may be disposed at the diagonally opposite corners of said plates similarly to the corresponding parts of the contactor 10 previously described. It is to be noted that the permanent magnet members 232 and 233 are disposed with like magnetic poles adjacent to the respective magnetic plates 244 and 242, as best shown in FIGS. 7 through 10.

As shown in FIGS. 7 through 10, the armature 260 is generally T-shaped in cross-section and comprises a first generally cylindrical portion 267 and a second flanged portion 264 which are both formed from a suitable soft magnetic material, such as iron. As illustrated, the upper end of the armature 260 may include a generally conical recess which is complementary to the generally conical shape of the lower end of the central leg member 245 to obtain a predetermined force characteristic in the operation of the contactor 210 which is desired in certain applications of the contactor 210. The armature 260 is biased generally downwardly away from the central leg member 245 of the stationary magnetic structure 230 by a suitable biasing means, such as the compression spring 272, which is disposed between the lower end of the central leg member 245 and the upper end of the armature 260, as shown in FIG. 7, with the upper and lower ends of the spring 272 surrounding the central leg member 245 and the upper end of the armature 260, respectively. The central leg member 245 and the upper end of the armature 260 may be provided with shoulder portions of a reduced cross-section which act as a spring seat for the spring 272.

In order to operatively couple or connect the armature 260 to the movable contact means 306, a non-magnetic connecting shaft 222 may be provided which includes a threaded portion (not shown) that projects into and engages an internally threaded central opening in the armature 260. The movable contact means 306 may be secured to the connecting shaft 222 by suitable means, such as an internally threaded flange member 307 which may be formed from an electrically insulating material and secured to the movable contact means 306 by suitable means, such as screws or bolts. The movable contact means 306 is disposed to engage and close a circuit extending between a pair of spaced, relatively stationary contacts 302 and 304, as illustrated in FIGS. 7 through 10.

In order to actuate the armature 260 between the different operating positions previously described, the energizing or operating coil or winding means 250 is disposed between the plates 242 and 244 around the central leg member 245 of the stationary magnetic structure and around the upper portion of the armature 260 with the pair of outer leg members 234 and 236 being disposed outside the operating coil means at a first pair of diagonally opposite corners of the plates 242 and 244 and with a pair of permanent magnet members 232 and 233 being disposed outside the operating coil means 250 at the other pair of diagonally opposite corners of the plates 242 and 244. The operating coil means 250 may be of the type previously described in detail in connection with the contactor 210.

Considering the overall operation of the contactor 210, it will be assumed initially that separable contacts of the contactor 210 are in the open circuit position as shown in FIG. 7 and that the movable armature 260 as in a corresponding position, as shown diagrammatically in FIG. 7, with the upper end of the armature 260 being spaced from lower end of the central leg member 245 by a predetermined spacing or non-magnetic gap, as indicated at 263, and with the flanged portion 264 of the armature being spaced from the shoulder portion 244a of the lower magnetic plate 244 by a predetermined spacing or gap, as indicated at 265 in FIG. 7. It will also be assumed initially that the operating coil or winding means 250 is deenergized and that substantially all or most of the magnetic flux from the permanent magnet latching members 232 and 233 is concentrated in the magnetic paths which include the outer leg members 234 and 236 with very little magnetic flux from the permanent magnet members 232 and 233 flowing through the magnetic path which includes the armature 260 and the central leg member 245. As shown in FIG. 7, the magnetic flux from each of the permanent magnet members 232 and 233 is primarily concentrated in the outer leg members 234 and 236 as indicated by the solid arrowed lines 310 and 320, respectively, since the effective reluctance of each of the paths which include the outer leg members 234 and 236 is relatively less than the effective magnetic reluctance of the path which includes the armature 260 and the central leg member 245. It is to be noted at this time that the armature 260 is held in the position shown in FIG. 7 by the biasing force applied to the armature 260 by the compression spring 272 which tends to actuate the plunger 260 in a downward direction, as viewed in FIG. 7.

In order to close the separable contacts of the contactor 210, at least one portion of the operating coil or winding means 250 is energized, as described in detail in connection with the contactor 10, to produce the magnetic fluxes indicated by the arrowed solid lines 340 and 350 shown in FIG. 8. When the operation coil 250 is energized to produce the magnetic fluxes indicated in FIG. 8, the magnetic flux produced by the current flow through the operating coil 250 will be in the same direction through the armature 260 and the central leg member 245 as the magnetic flux supplied from the permanent magnet members 232 and 233 with the magnetic flux produced by the current flow in the operating coil 250 being opposing or in an opposite direction with respect to the magnetic flux applied from the permanent magnet members to the outer leg members 234 and 236. The effective reluctance of each of the magnetic paths which include the outer leg members 234 and 236 is increased and the magnetic flux supplied from each of the permanent magnet members 232 and 233 will therefore be effectively shifted or transferred from the outer leg members 234 and 236 to the magnetic path which includes the armature 260 and the central leg member 245 of the stationary magnetic structure 230. The armature 260 will then be actuated or attracted upwardly by the magnetic flux from the permanent magnet members 232 and 233 and by the magnetic flux produced by current flow in the operating coil 250 until the upper end of the armature 260 is disposed adjacent to the lower end of the central leg member 245 as shown in FIG. 9 and the flanged portion of the armature 260 seats against the shoulder portion 244A of the lower magnetic plate 244.

When the armature 260 is actuated upwardly to the operating position shown in FIG. 9, the contact bridging member 306 previously described will also be actuated in an upward direction to engage the associated pair of stationary contacts 302 and 304 of the contact 210. When the armature 260 is actuated from the position shown in FIG. 7 to the position shown in FIG. 9 to thereby close the separable contacts of the contactor 210, the magnetic flux supplied from each of the permanent magnet members 232 and 233 which was previously concentrated in the magnetic paths which include the outer leg members 234 and 236, will be transferred to the magnetic path which includes the armature 260 and the central leg member 245 of the stationary magnetic structure 230 and will remain concentrated in the magnetic path which includes the armature 260 and the central leg member 245 since the reluctance of the magnetic path which includes the armature 260 will be relatively less than the reluctance of the magnetic paths which include the outer leg members 234 and 236 since the upper end of the armature 260 is disposed adjacent to the lower end of the central leg member 245 and the flanged portion 264 of the armature 260 is now seated against the lower end of the shoulder portion 244a of the lower plate 244 to thereby substantially eliminate the gap 265 which previously existed between the armature 260 and the lower plate 244. When the armature 260 reaches the operating position shown in FIG. 9, auxiliary switches (not shown) may be provided to deenergize the operating coil 250. The magnetic flux supplied from each of the permanent magnet members 232 and 233 will remain in the magnetic path which includes the armature 260, as shown in FIG. 9 and as indicated by the arrowed lines 360 and 370, even though the operating coil 250 is deenergized by the associated auxiliary switches at the end of the travel of the armature 260 because of the relatively lower reluctance which results in the magnetic path which includes the armature 260, as just described. In summary, similarly to the contactor 10, the magnetic flux supplied from each of the permanent magnet members 232 and 233 will magnetically latch the contactor 210 in the closed circuit condition shown in FIG. 9 since the magnetic flux from each of the permanent magnet members 232 and 233 will be substantially or mostly concentrated in the magnetic path which includes the armature 260 to thereby retain the armature 260 in the operating position shown in FIG. 9 against the force exerted on the armature 260 by the biasing spring 272.

In order to open the closed separable contacts of the contactor 210 and to actuate the armature 260 from the position shown in FIG. 9 back to the original operating position shown in FIG. 7, the operating coil or winding means 250 may now be energized in such a direction as to produce a magnetic flux, as indicated by the dotted arrowed lines 362 and 392 in FIG. 10, which will be in a direction opposite that of the magnetic flux produced in the armature 260 by each of the permanent magnet members 232 and 233 to thereby increase the effective reluctance of the magnetic path which includes the armature 260 and the central leg member 245 to thereby transfer or shift most of the magnetic flux from the permanent magnet members 232 and 233 from the magnetic path which includes the armature 260 and the central leg member 242 back to the outer leg members 234 and 236, as shown in FIG. 7. When the magnetic flux from the permanent magnet members 232 and 233 is shifted from the path which includes the armature 260 and the central leg member 245, the force exerted on the armature 260 by the biasing spring 272 is sufficient to actuate the armature 260 downwardly from the operating position shown in FIG. 9 back to the operating position shown in FIG. 7 with the previously closed separable contacts of the contacts of the contactor 210 being opened by the downward movement of the contact bridging member 306 back to the position shown in FIG. 7.

Referring now to FIG. 11 there is shown contactor 510 illustrating a third embodiment of the invention. In general, the contactor 510 is similar to the contactor 10 previously described except that the biasing spring in the contactor 510 is disposed between the armature 460 and the central leg member 445 of the contactor 510 rather than between the upper magnetic plate of the contactor and the associated contact barrier assembly, as in the contactor 10. It is also be noted that the contactor 510 differs from the contactor 210 just described in that the movable contact means 506 is pulled to the closed position by the movement of the associated armature 460 rather than being pushed to the closed position as in the contactor 210.

Similarly to the contactor 10, the stationary magnetic structure 430 of the contactor 510 comprises a pair of spaced upper and lower plates 442 and 444, respectively, which are formed from a suitable soft magnetic material, such as iron. As illustrated in FIG. 11, the plates 442 and 444 are disposed in generally parallel relationship and may be generally rectangular in configuration similarly to the plates 42 and 44 of the contactor 10. The stationary magnetic structure 430 also includes a central leg member 445 which is also formed from the suitable soft magnetic material, such as iron, and which projects upwardly from the lower plate 444 for only a portion of the distance between the plates 442 and 444. The central leg member may be formed integrally with the lower plate 444 or may be provided as a separate member which is secured to the lower plate 444 by suitable means, such as bolts. It is to be noted that the armature 460 of the contactor 510 has two predetermined operating positions, similarly to the armature 60 of the contactor 10 previously described, in which the lower end of the armature 460 is disposed adjacent to or to engage the upper end of the central leg member 445 or is spaced away from the central leg member 445 by a predetermined spacing or non-magnetic gap.

Similarly to the contractor 10, the contactor 510 includes a pair of outer leg members 434 and 436 which are disposed between the plates 442 and 444 which are formed from a suitable soft magnetic material, such as iron. The magnetic members 434 and 436 may be disposed at the diagonally opposite corners of the plates 442 and 444 which may also be generally rectangular in configuration. In order to provide a predetermined non-magnetic gap in each of the magnetic paths which include the outer leg members 434 and 436, a non-magnetic washer or spacer member (not shown) may be disposed between one end of each of the outer leg members 434 and 436 and the associated magnetic plates 442 and 444. The contactor 510 also includes a pair of permanent magnet members 432 and 433 similarly to the contactor 10 in order to magnetically latch the armature 460 in at least one operating position.

In order to bias the armature 460 which is illustrated as being generally T-shaped in cross-section to the operating position shown in FIG. 11, a suitable biasing means, such as the compression spring 472, may be disposed between the armature 460 and the upper end of the central leg member 445 with the upper end of the spring 472 surrounding the lower end of the armature 464 and the lower end of the spring 472 surrounding the upper end of the central leg member 445. The lower end of the armature 460 and the upper end of the central leg member 445 may be provided with shoulder portions which function as spring seats for the associated compresssion spring 472 as shown in FIG. 11.

In order to operatively couple the armature 460 to the movable contact means 506, a non-magnetic connecting shaft 522 may be provided which is connected at one end to the upper end of the armature 460 and on which the movable contact means 506 is supported.

In order to actuate the armature 460 between the different operating positions similarly to the contactor 10 previously described, the operating coil or winding means 450 is disposed between the plates 442 and 444 around the central leg member 445 of the stationary magnetic structure 430 and around the lower end of the plunger or armature 460 with the pair of outer leg members 434 and 436 being disposed outside the operating coil or winding means 450 at a first pair of diagonally opposite corners of the plates 442 and 444 and with the pair of permanent magnetic members 432 and 433 being disposed at the other diagonally opposite corners of the plates 442 and 444.

Considering the overall operation of the contactor 510, the details of the operation are similar to those of the contactors 10 and 210 previously described in detail. When the operating coil winding means 450 is deenergized initially and the plunger is in the operating position shown in FIG. 11 to which the armature 460 is normally biased, the magnetic flux from the permanent magnet members 432 and 433 is primarily concentrated in the outer leg members 434 and 436. In order to actuate the armature 460 from the position shown in FIG. 11 to the other operating position in which the lower end of the armature 460 is disposed adjacent to or engages the upper end of the central leg member 445, the operating coil 450 is energized in such a direction as to produce a magnetic flux which is the same direction through the armature 460 and the central leg member 445 as the magnetic flux from each of the permanent magnet members 432 and 433. The armature 460 is actuated downwardly until the flanged portion indicated at 462 engages the upper magnetic plate 442 and the lower end of the armature 460 is disposed adjacent to or engages the upper end of the central leg member 445 to thereby close separable contacts of the contactor 510. After the contactor 510 has been actuated to the operating condition in which the contacts are closed and the armature is actuated downwardly as just described, the contacts of the contactor 510 may be opened by energizing the operating coil 450 in such a direction as to produce a magnetic flux in the armature 460 and the central leg member 445 which opposes the magnetic flux in the armature 460 and the central leg member 445 from each of the permanent magnet members 432 and 433 to thereby permit the biasing spring 472 to actuate the armature 460 upwardly to the position shown in FIG. 11.

It is to be understood that the teachings of the invention may be applied to electromagnetic structures which employ various shapes of movable armatures or plungers such as the armature 60 which includes at least two movable parts or a single piece armature such as the armatures 260 and 460 described in detail. It is also to be understood that the teachings of the invention may be applied to electrical control devices including contacts which are normally closed rather than normally opened as in the contactors described. A single operating winding or coil may also be employed in certain applications to reduce the overall size and weight of an electromagnetic structure as disclosed by applying currents of opposite directions to obtain magnetic fluxes of corresponding directions to thereby actuate the armatures of the different contactors disclosed between the different operating positions.

It is to be noted that in the different embodiments of the invention, the biasing spring may be located between the armature and the central leg member, between one of the magnetic plates and the contact carrier, or between a flanged portion on the armature and the adjacent magnetic plate. It is also to be understood that in certain applications, the permanent magnet latching members may be combined in a single generally tubular member outside the operating coil between the associated plates. In addition, the outer soft magnetic members may be similarly combined in a generally tubular magnetic member located outside the operating coil with suitable non-magnetic gaps between the associated magnetic plates. If both the permanent magnet and outer magnetic members are combined in generally tubular members, the permanent magnet member may be disposed in concentric relation with the outer magnetic member either inside or outside the outer magnetic member. If either the permanent magnet or outer magnetic members are combined in a generally tubular member, the other magnetic members may be located either inside or outside the tubular member. Finally, it is to be understood that in certain applications, the effective reluctance of the path which includes the armature in the different electromagnetic structures disclosed need not be substantially greater than the effective reluctance of the paths which include the outer leg members depending on the magnetic materials selected or the length of travel of the armature between operating positions.

The apparatus embodying the teachings of this invention has several advantages. For example, the size and weight of the electrical control device including the electromagnetic structures as disclosed are reduced since the magnetic latching means employs different portions of the electromagnetic structure in common with the magnetic flux produced by the operating coil or winding means in the different constructions disclosed. It is important to note that the overall height or length of electromagnetic structure in the different embodiment as disclosed is kept substantially to a minimum while obtaining the advantages of magnetic latching which eliminates the moving parts required in various types of known mechanical latches employed for the same general purpose.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. An electromagnetic structure comprising a pair of substantially parallel, spaced magnetic plates, at least one outer magnetic member disposed to extend between the plates with a predetermined non-magnetic gap between each outer leg member and the plates, a central magnetic leg member extending from one plate toward the other plate for only a portion of the spacing between the plates, said other plate including a central opening substantially aligned with the central leg member, an armature disposed to pass through the opening in said other plate and to move reciprocally between a first position in which one end of the armature is disposed adjacent to the central leg member and a second position in which said one end is spaced away from the central leg member by a predetermined non-magnetic gap, means for biasing the armature toward the second position, one or more permanent magnetic members disposed to extend between the plates to provide a magnetic flux which passes through the armature and the central leg member to latch the armature in the first position, and means for actuating the armature between the first and second positions including coil means disposed between the plates around the central leg member and said one end of the armature, said coil means being energizable to actuate most of the magnetic flux from the permanent magnetic members between a first path which includes the armature and the central leg member and second path which includes the outer leg member.

2. The combination as claimed in claim 1 where each of the pair of plates is generally rectangular, at least two outer magnetic leg members are disposed at diagonally opposite corners of the plates and at least a pair of permanent magnetic members are disposed at the other diagonally opposite corner of the plates.

3. The combination as claimed in claim 1 wherein separable contact means are provided and operatively coupled to the movable armature to be actuated therewith between open and closed positions.

4. The combination as claimed in claim 2 wherein separable contacts are provided and operatively connected to the movable armature to be actuated therewith between open and closed positions.

5. An electrical control device comprising relatively stationary and movable contact means, and means for actuating the movable contact means between open and closed positions with respect to the stationary contact means, said actuating means comprising a pair of substantially parallel, spaced magnetic plates, at least one outer magnetic leg member disposed to extend between the plates with a predetermined non-magnetic gap between each outer leg member and the plates, a central magnetic leg member extending from one plate toward the other plate for only a portion of the spacing between the plates, said other plate including a central opening substantially aligned with the central leg member, an armature disposed to pass through the opening in said other plate and to move reciprocally between a first position in which one end of the armature is disposed adjacent to the central leg member and a second position in which said one end is spaced away from the central leg member by a predetermined non-magnetic gap, means for biasing the armature toward the second position, one or more permanent magnetic members disposed to extend between the plates to provide a magnetic flux which passes through the armature and the central leg member to latch the armature in the first position, and means for actuating the armature between the first and second positions including coil means disposed between the plates around the central leg member and said one end of the armature, said coil means being energizable to actuate most of the magnetic flux from the permanent magnetic members between a first path which includes the armature and the central leg member and second path which includes the outer leg member.

6. The combination as claimed in claim 4 wherein each of the pair of plates is generally rectangular, at least two outer magnetic leg members are disposed at diagonally opposite corners of the plates and at least a pair of permanent magnetic members are disposed at the other diagonally opposite corners of the plates.

7. The combination as claimed in claim 4 wherein separable contact means are provided and operatively coupled to the movable armature to be actuated therewith between open and closed positions.

8. The combination as claimed in claim 5 wherein the armature is generally T-shaped in cross-section with laterally extending portions disposed to engage said other plate around the central opening in the first position of said armature.

References Cited

UNITED STATES PATENTS

| 2,661,412 | 12/1953 | Dreyfus | 335—126 |
| 3,202,886 | 8/1965 | Kramer | 335—254 |

BERNARD A. GILHEANY, *Primary Examiner.*

H. BROOME, *Assistant Examiner.*

U.S. Cl. X.R.

335—170